United States Patent
Yu (10) Patent No.: US 9,316,853 B2
(45) Date of Patent: Apr. 19, 2016

(54) COMBINATION BACKBOARD AND BACKLIGHT MODULE AND LIQUID CRYSTAL DISPLAY DEVICE USING THE BACKBOARD

(75) Inventor: Gang Yu, Guangdong (CN)

(73) Assignee: SHENZHEN CHINA STAR OPTOELECTRONICS TECHNOLOGY CO., LTD., Shenzhen, Guangdong Province (CN)

(*) Notice: Subject to any disclaimer, the term of this patent is extended or adjusted under 35 U.S.C. 154(b) by 198 days.

(21) Appl. No.: 13/508,725

(22) PCT Filed: Mar. 21, 2012

(86) PCT No.: PCT/CN2012/072681
§ 371 (c)(1),
(2), (4) Date: May 8, 2012

(87) PCT Pub. No.: WO2013/120302
PCT Pub. Date: Aug. 22, 2013

(65) Prior Publication Data
US 2013/0208210 A1 Aug. 15, 2013

(30) Foreign Application Priority Data
Feb. 15, 2012 (CN) .......................... 2012 1 0034071

(51) Int. Cl.
*G02F 1/1333* (2006.01)
(52) U.S. Cl.
CPC *G02F 1/133308* (2013.01); *G02F 2001/13332* (2013.01); *G02F 2001/133314* (2013.01); *G02F 2001/133317* (2013.01); *G02F 2001/133322* (2013.01); *G02F 2001/133325* (2013.01)

(58) Field of Classification Search
USPC ........................................... 349/58, 65
See application file for complete search history.

(56) References Cited

U.S. PATENT DOCUMENTS

| | | | | |
|---|---|---|---|---|
| 6,648,666 B1* | 11/2003 | Wu | ............................. | 439/352 |
| 7,959,344 B2* | 6/2011 | Shin | ............................. | 362/633 |
| 8,047,668 B2* | 11/2011 | Chang et al. | ................. | 362/97.1 |
| 2009/0310054 A1* | 12/2009 | Shin et al. | ....................... | 349/58 |
| 2010/0165588 A1* | 7/2010 | Chan et al. | ..................... | 361/756 |
| 2010/0182756 A1* | 7/2010 | Tochi et al. | ..................... | 361/752 |
| 2011/0242758 A1* | 10/2011 | Makley et al. | ............ | 361/679.58 |
| 2012/0044685 A1* | 2/2012 | Chen et al. | ............... | 362/249.02 |
| 2012/0104207 A1* | 5/2012 | Hsieh et al. | ................ | 248/298.1 |
| 2013/0027965 A1* | 1/2013 | Noh et al. | ...................... | 362/602 |

* cited by examiner

*Primary Examiner* — Edward Glick
*Assistant Examiner* — Anthony G Quash
(74) *Attorney, Agent, or Firm* — Cheng-Ju Chiang (57) ABSTRACT

A combination backboard includes a main body to which a first bracket is coupled. The main body includes a base plate and first and second side plates perpendicularly mounted to the base plate and opposite to each other. The first and second side plates have an end forming a first coupling section adjacent to the first bracket. The first bracket includes a first bottom plate and a third side plate perpendicularly mounted to the first bottom plate. The third side plate has two ends forming resilient first coupling slots corresponding to the first coupling sections to receive and retained the first coupling sections therein for coupling the first bracket and the main body together. Also provided are a backlight module and a liquid crystal display device that use the combination backboard.

9 Claims, 6 Drawing Sheets

COMBINATION BACKBOARD AND BACKLIGHT MODULE AND LIQUID CRYSTAL DISPLAY DEVICE USING THE BACKBOARD

BACKGROUND OF THE INVENTION

1. Field of the Invention

The present invention relates to the technical field of liquid crystal displaying, and in particular to a combination backboard and a backlight module and a liquid crystal display device that use the backboard.

2. The Related Arts

Liquid crystal display (LCD) has a variety of advantages, such as compact device size, low power consumption, and being free of radiation, and is thus widely used. Most of the LCDs that are currently available in the market are backlighting LCDs, which comprise a liquid crystal panel and a backlight module. The working principle of the liquid crystal panel is that liquid crystal molecules are interposed between two parallel glass plates and a plurality of vertical and horizontal fine electrical wires is arranged between the two glass plates, whereby the liquid crystal molecules are controlled to change direction by application of electricity to refract light emitting from the backlight module for generating images. Since the liquid crystal panel itself does not emit light, light must be provided by the backlight module in order to generate images. Thus, the backlight module is one of the key components of an LCD. The backlight module can be classified as two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source to directly provide lighting to the liquid crystal panel. The side-edge backlight module arranged an LED light bar at an edge of a backboard that is located rearward of one side of the liquid crystal panel. The LED light bar emits light that enters a light guide plate through a light incident face of the light guide plate and is projected out through a light exit face after being reflected and diffused to thereby form a planar light source to be provided to the liquid crystal panel.

A known liquid crystal display device that adopts the side-edge backlight module comprises: a backboard, a backlight source arranged inside the backboard, a reflection plate arranged inside the backboard, a light guide board arranged on the reflection plate, an optic film assembly arranged on the light guide board, a plastic frame mounted to the backboard, a liquid crystal display panel arranged on the plastic frame, and a front bezel mounted to the plastic frame. The backboard comprises a bottom plate and side plate perpendicularly coupled to the bottom plate. The backlight source is fixedly mounted on the side plates of the backboard. In an attempt t replace the backlight source, the whole liquid crystal display device must be removed. In other words, the front bezel, the liquid crystal display panel, the plastic frame, the optic film assembly, and the light guide board must be sequentially disassembled before the backlight source can be removed. The operation is complicated and time- and effort-consuming. Further, components, such as the liquid crystal display panel, the plastic frame, the optic film assembly, and the liquid guide board, may easily get damaged during the disassembling process, eventually leading to re-working or increase of maintenance cost.

SUMMARY OF THE INVENTION

Thus, an object of the present invention is to provide a combination backboard, which is formed by assembling a main body and a bracket together through engagement effected between coupling sections and coupling slots, so that the structure is simple and the manufacture is easy.

Another object of the present invention is to provide a backlight module, which comprises the combination backboard described above to simplify disassembling operation of a backlight source and thus reducing the cost of re-working and maintenance.

A further object of the present invention is to provide a liquid crystal display device, which comprises the combination backboard described above to simplify disassembling operation of a backlight source and thus reducing the cost of re-working and maintenance.

To achieve the objective, the present invention provides a combination backboard, which comprises: a main body and a first bracket coupled to the main body. The main body comprises a base plate and first and second side plates perpendicularly mounted to the base plate. The first and second side plates are arranged opposite to each other. The first and second side plates each have an end adjacent to the first bracket and forming a first coupling section. The first bracket comprises a first bottom plate and a third side plate perpendicularly mounted to the first bottom plate. The third side plate has two ends respectively forming first coupling slots corresponding to the first coupling sections. The first coupling sections are respectively received and retained in the first coupling slots to couple the first bracket and the main body together.

The first coupling sections are of an L-shape, which horizontally extends in a direction along the first or the second side plate beyond the base plate, and each of the first coupling sections has a distal free end that is curved.

The main body comprises a fourth side plate perpendicularly mounted to the base plate. The fourth side plate has two ends respectively connected to ends of the first and second side plates that are distant from the first coupling sections. The base plate is integrally formed with the first, second, and fourth side plates.

A second bracket is further provided to couple to the main body. The second bracket comprises a second bottom plate and a fifth side plate perpendicularly mounted to the second bottom plate. The fifth side plate has two ends respectively forming second coupling slots. The first and second side plates of the main body each have an end distant from the first coupling section and forming a second coupling section corresponding to the second coupling slot. The second coupling sections are respectively received and retained in the second coupling slots to couple the second bracket and the main body together.

The second coupling sections are of an L-shape, which horizontally extends in a direction of the first or second side plate beyond the base plate, and the second coupling sections have distal free ends that are curved. The second coupling sections each form a notch corresponding to the second bottom plate in order to expose the second bottom plate for easy removal of the second bracket.

The first coupling sections each form a notch corresponding to the first bottom plate in order to expose the first bottom plate for easy removal of the first bracket.

The present invention also provides a backlight module, which comprises a combination backboard, a backlight source arranged inside the combination backboard, a light guide board arranged inside the combination backboard, and a plastic frame mounted to the backboard. The combination backboard comprises: a main body and a first bracket coupled to the main body. The main body comprises a base plate and first and second side plates perpendicularly mounted to the base plate. The first and second side plates are arranged opposite to each other. The first and second side plates each have an end adjacent to the first bracket and forming a first coupling section. The first bracket comprises a first bottom plate and a third side plate perpendicularly mounted to the first bottom plate. The third side plate has two ends respectively forming first coupling slots corresponding to the first coupling sections. The first coupling sections are respectively received and retained in the first coupling slots to couple the first bracket and the main body together. The backlight source is mounted to the third side plate of the first bracket.

The first coupling sections are of an L-shape, which horizontally extends in a direction along the first or the second side plate beyond the base plate, and each of the first coupling sections has a distal free end that is curved. The first coupling sections each form a notch corresponding to the first bottom plate in order to expose the first bottom plate for easy removal of the first bracket.

The present invention also provides a liquid crystal display device, which comprises a backlight module, a liquid crystal display panel arranged on the backlight module, and a front bezel arranged on the liquid crystal display panel. The backlight module comprises a combination backboard, a backlight source arranged inside the combination backboard, a light guide board arranged inside the combination backboard, and a plastic frame mounted to the backboard. The combination backboard comprises: a main body and a first bracket coupled to the main body. The main body comprises a base plate and first and second side plates perpendicularly mounted to the base plate. The first and second side plates are arranged opposite to each other. The first and second side plates each have an end adjacent to the first bracket and forming a first coupling section. The first bracket comprises a first bottom plate and a third side plate perpendicularly mounted to the first bottom plate. The third side plate has two ends respectively forming first coupling slots corresponding to the first coupling sections. The first coupling sections are respectively received and retained in the first coupling slots to couple the first bracket and the main body together. The backlight source is mounted to the third side plate of the first bracket. The liquid crystal display panel is arranged on the plastic frame.

The first coupling sections are of an L-shape, which horizontally extends in a direction along the first or the second side plate beyond the base plate, and each of the first coupling sections has a distal free end that is curved. The first coupling sections each form a notch corresponding to the first bottom plate in order to expose the first bottom plate for easy removal of the first bracket.

The efficacy of the present invention is that: the present invention provides a combination backboard, which is formed by assembling a main body and a bracket together through engagement effected between coupling sections and coupling slots, so that the structure is simple and the manufacture is easy. Further, the main body is made of steel material, so that the coupling section is of a predetermined resiliency to facilitate stable and secured coupling between the coupling section and the coupling slot. The present invention provides a backlight module, which comprises the combination backboard so that in maintenance and replacement of a backlight source, it only needs to separate a bracket to which the backlight source is mounted from the main body so as to eliminate the complicated operation of the known techniques that require removal of the complete backlight module before the backlight source can be replaced and avoid component damage caused by the disassembling operation and thus realizing both simplifying the maintenance operation and preventing increase of maintenance cost. The present invention provides a liquid crystal display device, which comprises the combination backboard so that in maintenance and replacement of a backlight source, it only needs to separate a bracket to which the backlight source is mounted from the main body so as to eliminate the complicated operation of the known techniques that require removal of the complete liquid crystal display device before the backlight source can be replaced and avoid component damage caused by the disassembling operation and thus realizing both simplifying the maintenance operation and preventing increase of maintenance cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Referring to FIGS. 1-4, the present invention provides a combination backboard 30, which comprises: a main body 2 and a first bracket 4 coupled to the main body 2.

The main body 2 comprises a base plate 22 and first, second, and fourth side plates 24, 26, 28 perpendicularly mounted to the base plate 22. The first and second side plates 24, 26 are arranged opposite to each other. The first and second side plates 24, 26 each have an end adjacent to the first bracket 4 and forming a first coupling section 246. The fourth side plate 28 has two ends respectively connected to ends of the first and second side plates 24, 26 that are distant from the first coupling sections 246. The base plate 22 is integrally formed with the first, second, and fourth side plates 24, 26, 28.

The first bracket 4 comprises a first bottom plate 42 and a third side plate 44 perpendicularly mounted to the first bottom plate 42. The third side plate 44 has two ends respectively forming first coupling slots 424 corresponding to the first coupling sections 246.

The first coupling sections 246 are respectively received and retained in the first coupling slots 424 to couple the first bracket 4 and the main body 2 together to form a complete combination backboard 30. The first coupling sections 246 are of predetermined resiliency to make the coupling between the first coupling sections 246 and the first coupling slots 424 stable and secured.

Preferably, the first coupling section 246 is of an L-shape, which horizontally extends in a direction along the first or the second side plate 24, 26 beyond the base plate 22, and the first coupling section 246 has a distal free end that is curved. Further, the first coupling section 246 forms a notch 46 corresponding to the first bottom plate 42 in order to expose the first bottom plate 42 for easy removal of the first bracket 4. In assembling, the first bracket 4 is fit, in a direction from lower side to upper side, into the main body 2 and the first coupling sections 246 are respectively fit into the first coupling slots 424, so that with the resiliency of the first coupling sections 246, the first bracket 4 is securely retained thereby completing the assembling of the combination backboard 30. To disassemble, with the aid of the notches 46, the first bracket 4 is simply pulled off from the underside of the main body 2 so that assembling and disassembling are easy and convenient.

Figure 5:
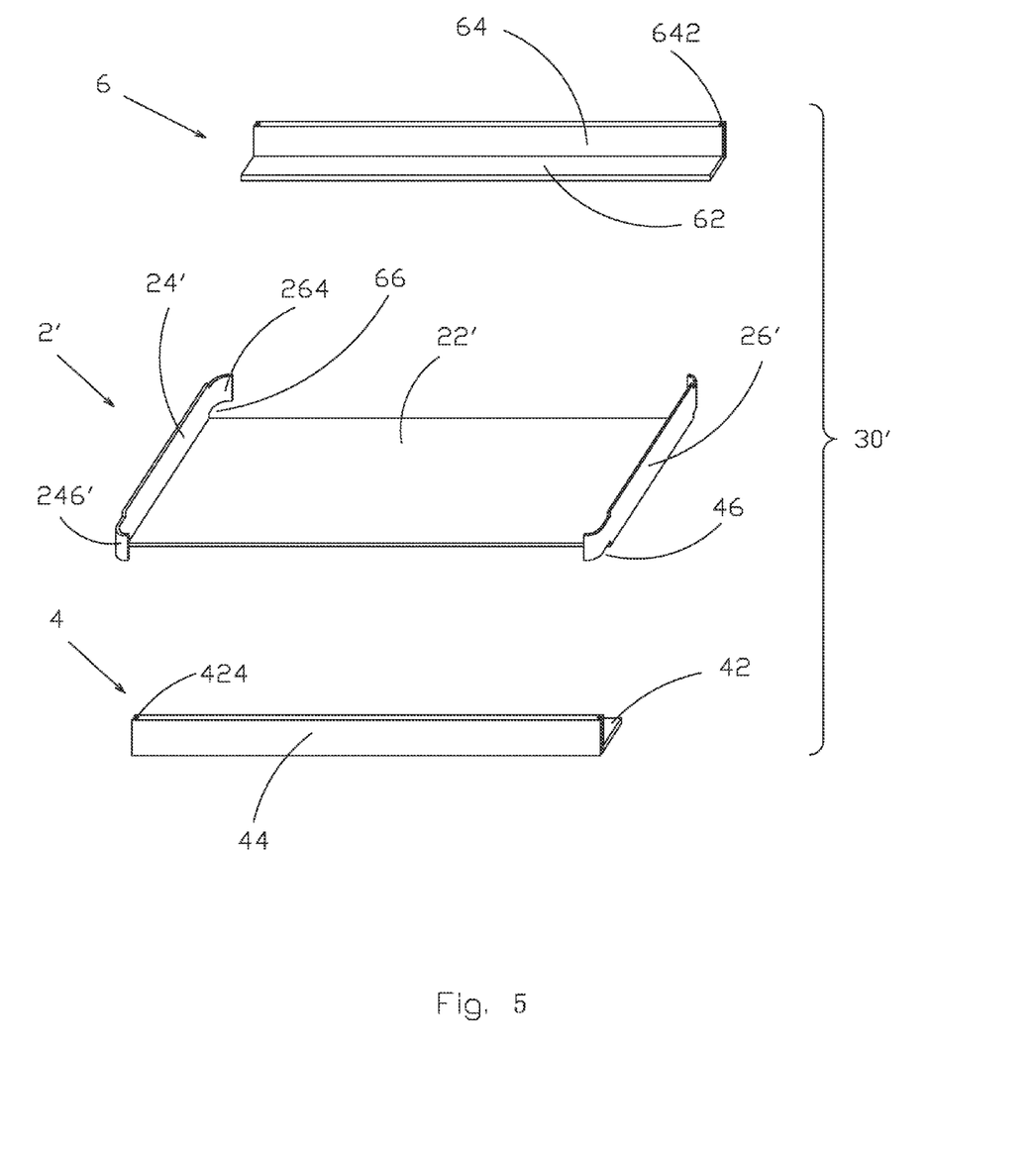
FIG. 5 is an exploded view of a combination backboard according to another embodiment of the present invention.

Referring to FIG. 5, an exploded view of a combination backboard 30' according to another embodiment of the present invention is shown. The combination backboard 30' comprises: a main body 2', a first bracket 4 coupled to the main body 2', and a second bracket 6 coupled to the main body 2'.

The main body 2' comprise a base plate 22' and a first and a second side plates 24', 26' perpendicularly mounted to the base plate 22'. The first and second side plates 24', 26' are arranged opposite to each other. The first and second side plates 24', 26' each have an end adjacent to the first bracket 4' and forming a first coupling section 246' and an end distant from the first coupling section 246' and forming a second coupling section 264. The second coupling sections 264 are of an L-shape, which horizontally extends in a direction of the first or second side plate 24', 26' beyond the base plate 22', and the second coupling sections 264 have distal free ends that are curved.

The first bracket 4 comprises a first bottom plate 42 and a third side plate 44 perpendicularly mounted to the first bottom plate 42. The third side plate 44 has two ends respectively forming first coupling slots 424 corresponding to the first coupling sections 246.

The second bracket 6 comprises a second bottom plate 62 and a fifth side plate 64 perpendicularly mounted to the second bottom plate 62. The fifth side plate 64 has two ends respectively forming second coupling slots 642.

The first and second coupling sections 246', 264 are respectively received and retained in the first and second coupling slots 424, 642 to couple the first bracket 4, the second bracket 6, and the main body 2 together to form a complete combination backboard 30'. The first coupling section 246' forms a notch 46 corresponding to the first bottom plate 42 in order to expose the first bottom plate 62 for easy removal of the first bracket 4. The second coupling section 264 forms a notch 66 corresponding to the second bottom plate 62 in order to expose the second bottom plate 62 for easy removal of the second bracket 6.

In summary, the present invention provides a combination backboard 30', which has a simple structure and is easy to manufacture and comprises first and second coupling sections 246', 264 that are of predetermined resiliency to facilitate secure coupling between the first and second coupling sections 246', 264 and the first and second coupling slots 424, 642.

Figure 1:
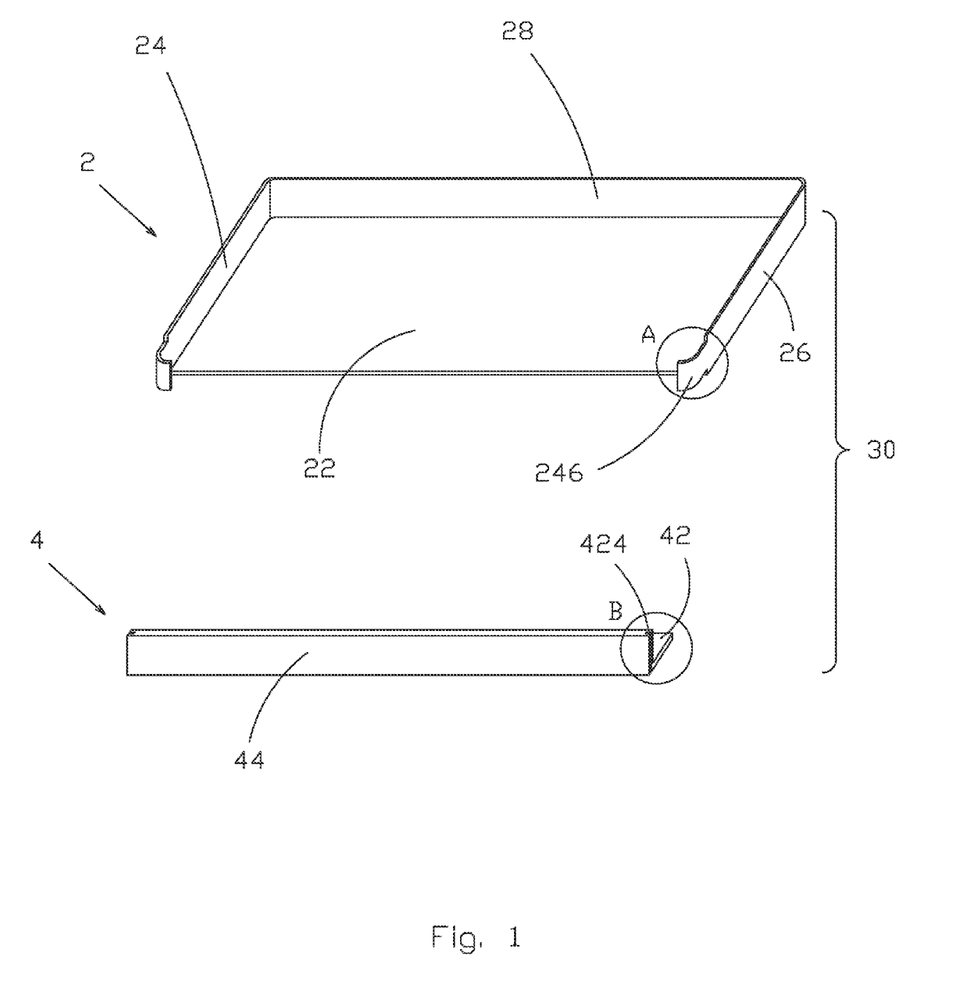
FIG. 1 is an exploded view of a combination backboard according to the present invention.
Figure 2:
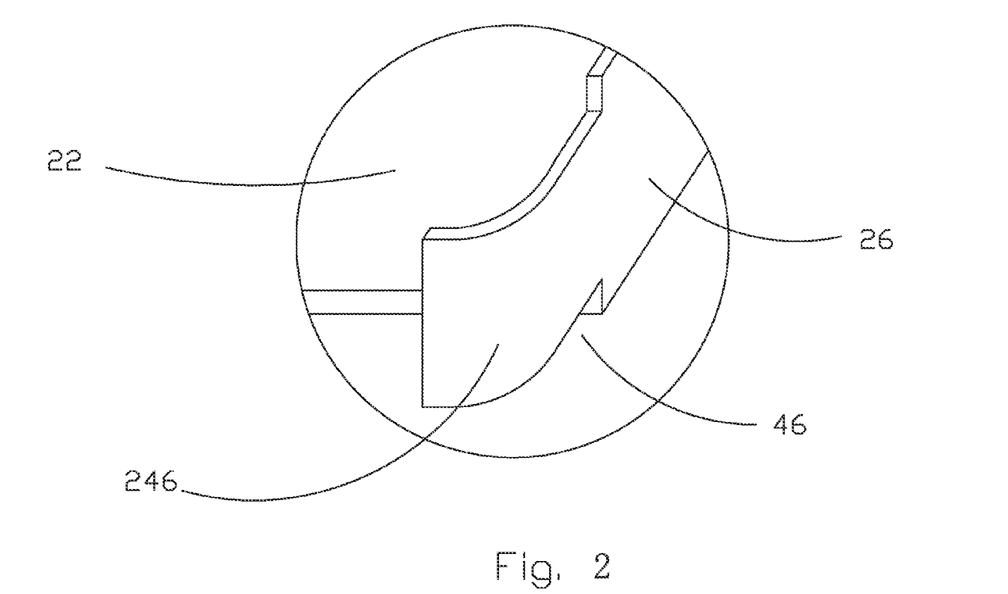
FIG. 2 is a partial enlarged view of circled portion A of FIG. 1.
Figure 3:
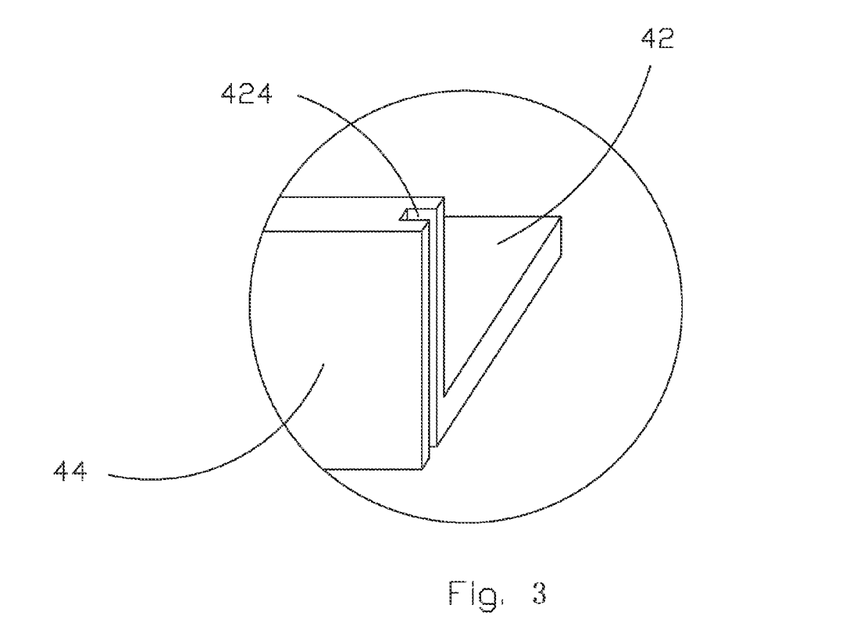
FIG. 3 is a partial enlarged view of circled portion B of FIG. 1.
Figure 4:
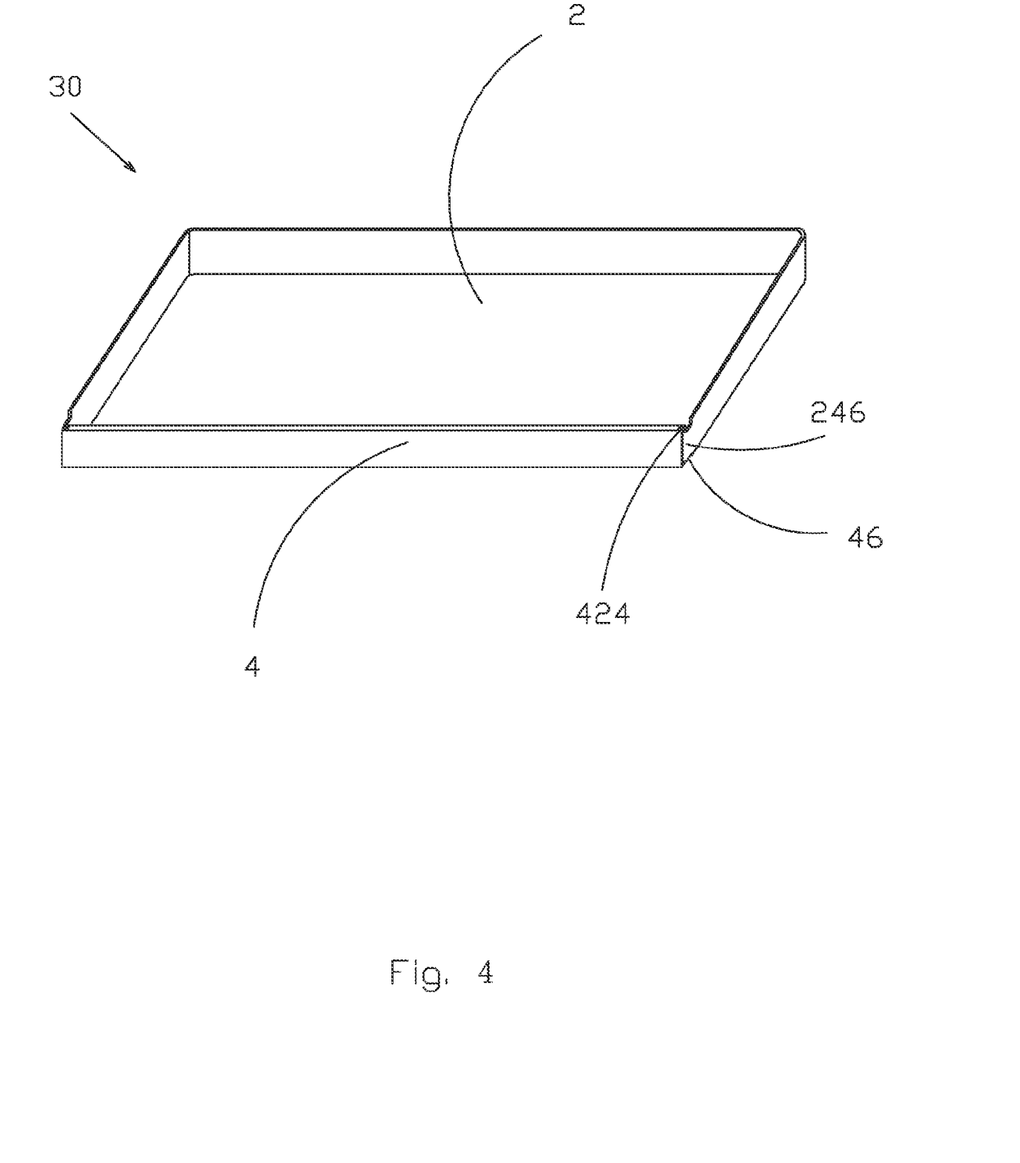
FIG. 4 is a perspective view of FIG. 1 in an assembled form.
Figure 6:
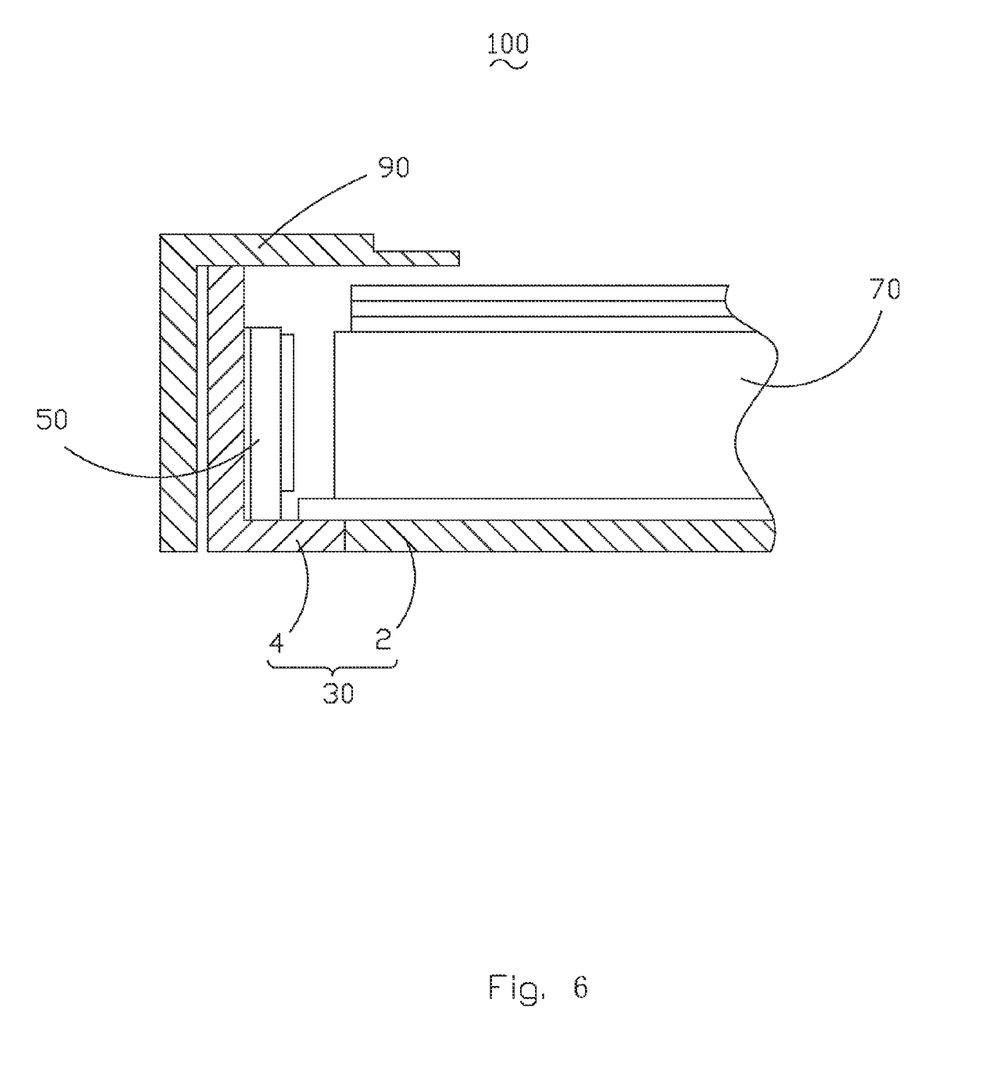
FIG. 6 is a cross-sectional view of a backlight module according to the present invention.

Referring to FIGS. 1, 2, and 6, the present invention further provides a backlight module 100, which comprises: a combination backboard 30, a backlight source 50 arranged inside the combination backboard 30, a light guide board 70 arranged inside the combination backboard 30, and a plastic frame 90 mounted to the backboard 30. The combination backboard 30 comprises: a main body 2 and a first bracket 4 coupled to the main body 2. The main body 2 comprises a base plate 22 and first and second side plates 24, 26 perpendicularly mounted to the base plate 22. The first and second side plates 24, 26 are arranged opposite to each other. The first and second side plates 24, 26 each have an end adjacent to the first bracket 4 and forming a first coupling section 246. The first bracket 4 comprises a first bottom plate 42 and a third side plate 44 perpendicularly mounted to the first bottom plate 42. The third side plate 44 has two ends respectively forming first coupling slots 424 corresponding to the first coupling sections 246. The first coupling sections 246 are respectively received and retained in the first coupling slots 424 to couple the first bracket 4 and the main body 2 together. The backlight source 50 is mounted to the third side plate 44 of the first bracket 4. The first coupling sections 246 are of an L-shape, which horizontally extends in a direction along the first or the second side plate 24, 26 beyond the base plate 22, and the first coupling section 246 has a distal free end that is curved. Further, the first coupling section 246 forms a notch 46 corresponding to the first bottom plate 42 in order to expose the first bottom plate 42 for easy removal of the first bracket 4.

In the maintenance and repair of the backlight module 100 according to the present invention and replacing the backlight source 50, what is needed to do is to separate the first bracket 4 to which the backlight source 50 is mounted from the main body 2, thereby eliminating the complicated operation of removal of the complete backlight module 100 before the backlight source 50 can be replaced and also avoiding damage of the components due to the disassembling operation. As such, both simplifying the maintenance operation and preventing increase of maintenance cost can be realized.

Referring to FIGS. 1, 2, 6, and 7, the present invention further provides a liquid crystal display device, which comprises: a backlight module 100, a liquid crystal display panel 200 arranged on the backlight module 100, and a front bezel 300 arranged on the liquid crystal display panel 200. The backlight module 100 comprises a combination backboard 30, a backlight source 50 arranged inside the combination backboard 30, a light guide board 70 arranged inside the combination backboard 30, and a plastic frame 90 mounted to the combination backboard 30. The combination backboard 30 comprises: a main body 2 and a first bracket 4 coupled to the main body 2. The main body 2 comprises a base plate 22 and first and second side plates 24, 26 perpendicularly mounted to the base plate 22. The first and second side plates 24, 26 are arranged opposite to each other. The first and second side plates 24, 26 each have an end adjacent to the first bracket 4 and forming a first coupling section 246. The first bracket 4 comprises a first bottom plate 42 and a third side plate 44 perpendicularly mounted to the first bottom plate 42. The third side plate 44 has two ends respectively forming first coupling slots 424 corresponding to the first coupling sections 246. The first coupling sections 246 are respectively received and retained in the first coupling slots 424 to couple the first bracket 4 and the main body 2 together. The backlight source 50 is mounted to the third side plate 44 of the first bracket 4. The liquid crystal display panel 200 is mounted on the plastic frame 90. The first coupling sections 246 are of an L-shape, which horizontally extends in a direction along the first or the second side plate 24, 26 beyond the base plate 22, and the first coupling section 246 has a distal free end that is curved. Further, the first coupling section 246 forms a notch 46 corresponding to the first bottom plate 42 in order to expose the first bottom plate 42 for easy removal of the first bracket 4.

Figure 7:
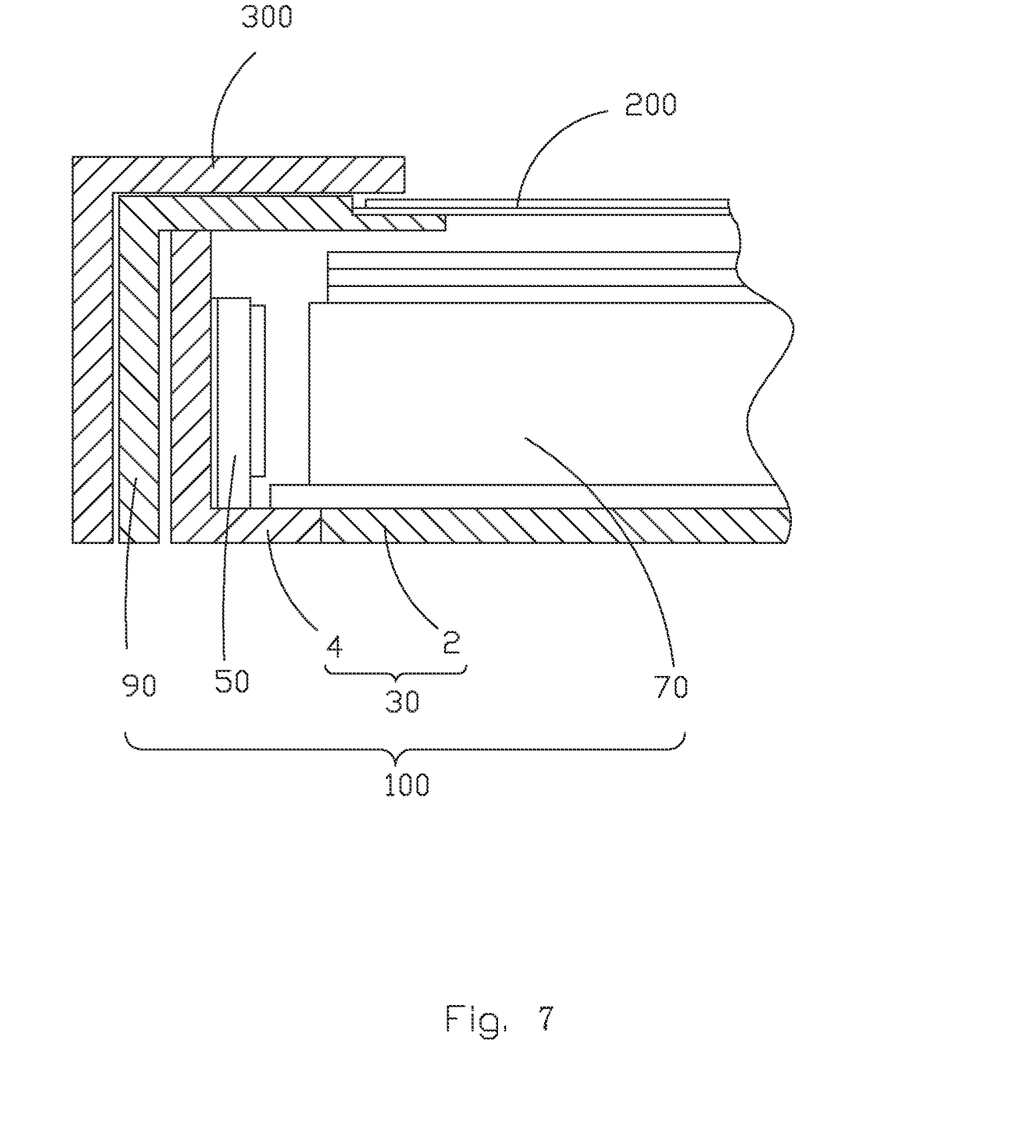
FIG. 7 is a cross-sectional view of a liquid crystal display device according to the present invention.

In the maintenance and repair of the liquid crystal display device according to the present invention and replacing the backlight source 50, what is needed to do is to separate the first bracket 4 to which the backlight source 50 is mounted from the main body 2, thereby eliminating the complicated operation of removal of the complete liquid crystal display device before the backlight source 50 can be replaced and also avoiding damage of the components due to the disassembling operation. As such, both simplifying the maintenance operation and preventing increase of maintenance cost can be realized.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A combination backboard, comprising: a main body and a first bracket coupled to the main body, the main body comprising a base plate and first and second side plates perpendicularly mounted to the base plate, the first and second side plates being arranged opposite to each other, the first and second side plates each having an end adjacent to the first bracket and forming a first coupling section, the first bracket comprising a first bottom plate and a third side plate perpendicularly mounted to the first bottom plate, the third side plate having two ends respectively forming first coupling slots corresponding to the first coupling sections, the first coupling sections being respectively received and retained in the first coupling slots to couple the first bracket and the main body together in such a way that a surface of the base plate is substantially flush with a surface of the first bottom plate to collectively define a flat planar surface;

wherein the first coupling sections are of an L-shape and are of resiliency, which is substantially coplanar with and horizontally extends in a direction along the first or the second side plate beyond the base plate, and each of the first coupling sections has a distal free end that is curved and defines an edge extending vertically so that the edges of the free ends of the first coupling sections face each other and wherein the first coupling slots are formed in the two ends of the third side plate to face away from each other and extend vertically through the ends of the third side plate and are perpendicular to the flat planar surface and the surfaces of the base plate and the first bottom plate thereby each defining an upper opening and a lower opening in top and bottom sides of the third side plate for receiving the edge of the distal end of the corresponding first coupling section to slidably insert into the first coupling slot from the upper opening in such a way that the edges of the free ends of the first coupling sections are simultaneously received into the first coupling slots to securely and stably retain the third side plate in position through the resiliency thereof.

2. The combination backboard as claimed in claim 1, wherein the main body comprises a fourth side plate perpendicularly mounted to the base plate, the fourth side plate having two ends respectively connected to ends of the first and second side plates that are distant from the first coupling sections, the base plate being integrally formed with the first, second, and fourth side plates.

3. The combination backboard as claimed in claim 1 further comprising a second bracket coupled to the main body, the second bracket comprising a second bottom plate and a fifth side plate perpendicularly mounted to the second bottom plate, the fifth side plate having two ends respectively forming second coupling slots, the first and second side plates of the main body each having an end distant from the first coupling section and forming a second coupling section corresponding to the second coupling slot, the second coupling sections being respectively received and retained in the second coupling slots to couple the second bracket and the main body together.

4. The combination backboard as claimed in claim 3, wherein the second coupling sections are of an L-shape, which horizontally extends in a direction of the first or second side plate beyond the base plate, and the second coupling sections have distal free ends that are curved, the second coupling sections each forming a notch corresponding to the second bottom plate in order to expose the second bottom plate for easy removal of the second bracket.

5. The combination backboard as claimed in claim 1, wherein the first coupling sections each form a notch corresponding to the first bottom plate in order to expose the first bottom plate for easy removal of the first bracket.

6. A backlight module, comprising a combination backboard, a backlight source arranged inside the combination backboard, a light guide board arranged inside the combination backboard, and a plastic frame mounted to the combination backboard, the combination backboard comprising: a main body and a first bracket coupled to the main body, the main body comprising a base plate and first and second side plates perpendicularly mounted to the base plate, the first and second side plates being arranged opposite to each other, the first and second side plates each having an end adjacent to the first bracket and forming a first coupling section, the first bracket comprising a first bottom plate and a third side plate perpendicularly mounted to the first bottom plate, the third side plate having two ends respectively forming first coupling slots corresponding to the first coupling sections, the first coupling sections being respectively received and retained in the first coupling slots to couple the first bracket and the main body together, the backlight source being mounted to the third side plate of the first bracket;

wherein the first coupling sections are of an L-shape and are of resiliency, which is substantially coplanar with and horizontally extends in a direction along the first or the second side plate beyond the base plate, and each of the first coupling sections has a distal free end that is curved and defines an edge extending vertically so that the edges of the free ends of the first coupling sections face each other and wherein the first coupling slots are formed in the two ends of the third side plate to face away from each other and extend vertically through the ends of the third side plate and are perpendicular to the flat planar surface and the surfaces of the base plate and the first bottom plate thereby each defining an upper opening and a lower opening in top and bottom sides of the third side plate for receiving the edge of the distal end of the corresponding first coupling section to slidably insert into the first coupling slot from the upper opening in such a way that the edges of the free ends of the first coupling sections are simultaneously received into the first coupling slots to securely and stably retain the third side plate in position through the resiliency thereof.

7. The backlight module as claimed in claim 6, wherein each of the first coupling sections forms a notch corresponding to the first bottom plate in order to expose the first bottom plate for easy removal of the first bracket.

8. A liquid crystal display device, comprising a backlight module, a liquid crystal display panel arranged on the backlight module, and a front bezel arranged on the liquid crystal display panel, wherein the backlight module comprises a combination backboard, a backlight source arranged inside the combination backboard, a light guide board arranged inside the combination backboard, and a plastic frame mounted to the combination backboard, the combination backboard comprising: a main body and a first bracket coupled to the main body, the main body comprising a base plate and first and second side plates perpendicularly mounted to the base plate, the first and second side plates being arranged opposite to each other, the first and second side plates each having an end adjacent to the first bracket and forming a first coupling section, the first bracket comprising a first bottom plate and a third side plate perpendicularly mounted to the first bottom plate, the third side plate having two ends respectively forming first coupling slots corresponding to the first coupling sections, the first coupling sections being respectively received and retained in the first coupling slots to couple the first bracket and the main body together, the backlight source being mounted to the third side plate of the first bracket, the liquid crystal display panel being arranged on the plastic frame;

wherein the first coupling sections are of an L-shape and are of resiliency, which is substantially coplanar with and horizontally extends in a direction along the first or the second side plate beyond the base plate, and each of the first coupling sections has a distal free end that is curved and defines an edge extending vertically so that the edges of the free ends of the first coupling sections face each other and wherein the first coupling slots are formed in the two ends of the third side plate to face away from each other and extend vertically through the ends of the third side plate and are perpendicular to the flat planar surface and the surfaces of the base plate and the first bottom plate thereby each defining an upper opening and a lower opening in top and bottom sides of the third side plate for receiving the edge of the distal end of the corresponding first coupling section to slidably insert into the first coupling slot from the upper opening in such a way that the edges of the free ends of the first coupling sections are simultaneously received into the first coupling slots to securely and stably retain the third side plate in position through the resiliency thereof.

9. The liquid crystal display device as claimed in claim 8, wherein each of the first coupling sections forms a notch corresponding to the first bottom plate in order to expose the first bottom plate for easy removal of the first bracket.

* * * * *